Feb. 7, 1933.   C. H. SPANGLER   1,896,598
PRONG TYPE HOLDER FOR SAFETY TESTING DEVICES
Filed July 13, 1931
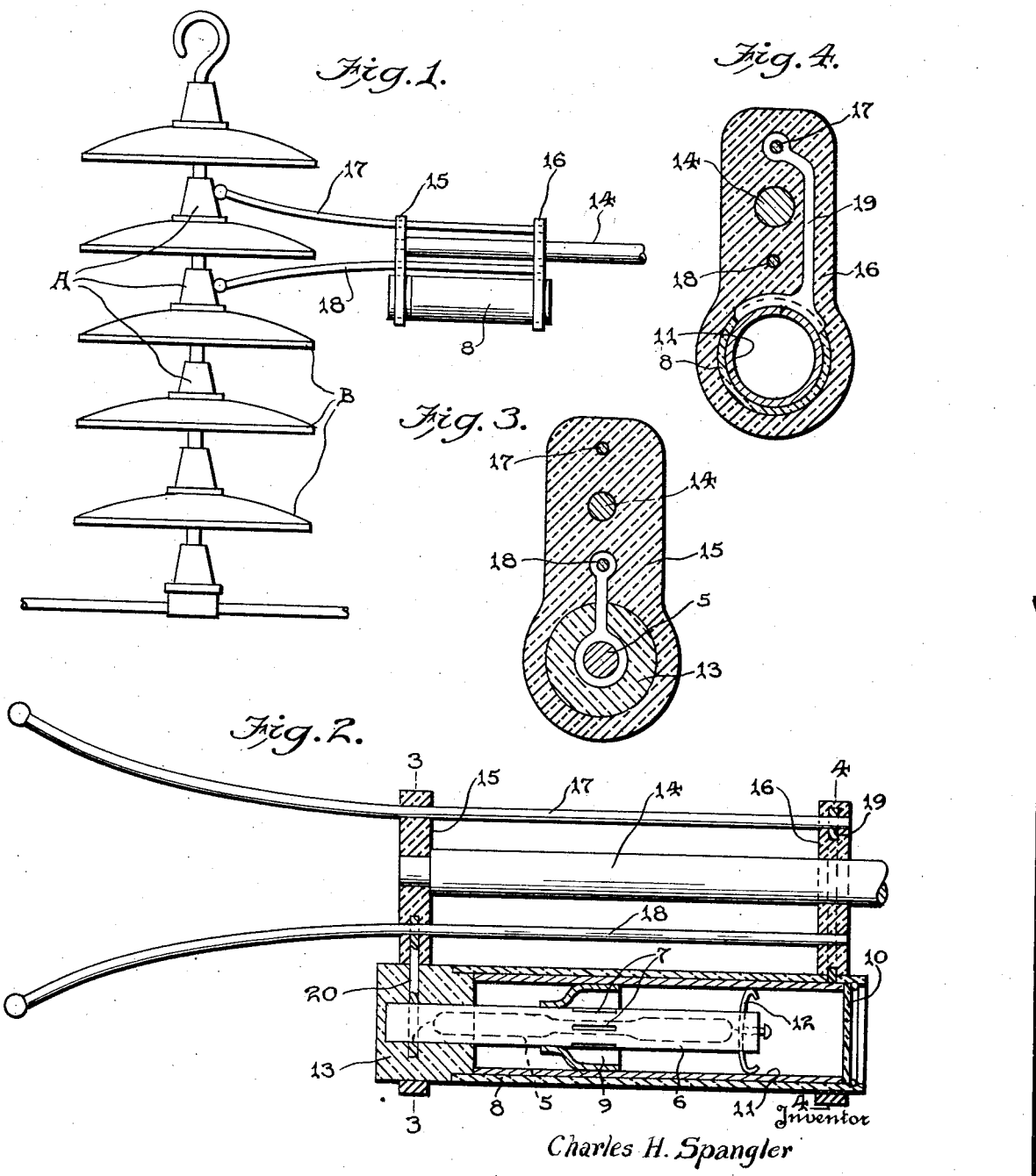
Charles H. Spangler Patented Feb. 7, 1933

1,896,598

UNITED STATES PATENT OFFICE

CHARLES H. SPANGLER, OF READING, PENNSYLVANIA, ASSIGNOR TO METROPOLITAN EDISON COMPANY, OF READING, PENNSYLVANIA, A CORPORATION OF PENNSYLVANIA

PRONG-TYPE HOLDER FOR SAFETY TESTING DEVICES

Application filed July 13, 1931. Serial No. 550,433.

This invention relates to improvements in safety testing devices for high tension electrical insulators and more especially to an improved plural pronged device for testing the suspension type insulators supporting said line.

The primary purpose of the invention is to improve detectors of the types shown in my Patent No. 1,701,196, dated February 5, 1929, and my Patent No. 1,831,372 dated Nov. 10, 1931. The new device is of the same nature as those devices, but has a plurality of prongs to enable it to bridge the porcelain disks of a suspended type of insulator.

With the foregoing objects outlined and with other objects in view which will appear as the description proceeds, the invention consists in the novel features hereinafter described in detail, illustrated in the accompanying drawing, and more particularly pointed out in the appended claim.

In the drawing:

Fig. 1 is a side elevation of the improved testing device illustrated in connection with a number of suspended insulators.

Fig. 2 is an enlarged sectional view of the device.

Figs. 3 and 4 are transverse sectional views taken respectively on lines 3—3 and 4—4 of Fig. 2.

As shown in the drawing, I employ a luminous detector device of the type indicated and more fully set forth in my above mentioned prior patent. The essential elements of said detector comprises a gas filled tube 5 in an enclosing casing 6 having wall apertures 7, all mounted in an insulating open-end carrier tube 8 having a reflector 9 adjacent apertures 7, adapted to direct any luminous rays appearing in said apertures rearwardly through the window 10, positioned at one end of the casing. An inner carrier sleeve 11 is conductively connected with one end of the tube 5 through tube support 12, and the opposite end of the tube projects into an insulating carrier end closure 13.

In accordance with the present invention, the supporting pole 14 of the device rigidly supports a pair of arms 15 and 16 formed of any suitable insulating material. One of these arms surrounds and is rigidly connected to the end closure 13, while the other one surrounds and rigidly supports the casing 8.

The arms also carry a pair of prongs 17, 18, the prong 17 being electrically connected to the sleeve 11 by means of a conductor element 19 that is preferably embedded in the arm 16. Another conducting element 20, which is embedded in the arm 15 and end closure, electrically connects the prong 18 to one end of the tube 5.

By contacting the prongs with the metal carriers A of the porcelain disks B, the lamp will glow and its light will be reflected through the window 10. The volume of glow will progressively decrease as the prongs are moved away from the high tension wire, and thus indicate that all is satisfactory. Should one insulator disk be perforated, or have some other fault, the current will pass through it to the next disk mounting, and no glow will appear, or the glow will be materially reduced, thus indicating a defect.

Detectors in accordance with my invention have been practically employed, and have proven valuable as a safety device, and in detecting improper insulators with little trouble. Usually, insulators, for test purposes, had to be removed and taken to a test station. In accordance with the invention, they can be tested without removal, and while the line is energized.

From the foregoing it is believed that the construction, operation and advantages of the invention may be readily understood, and I am aware that changes may be made in the details disclosed, without departing from the spirit of the invention, as expressed in the claim.

What is claimed and desired to be secured by Letters Patent is:

A safety tester device for high tension line suspension-type insulators, comprising a pair of spaced contact prongs, a ray reflecting luminous detector, and a supporting pole therefor having adjacent one end thereof spaced arms of insulating material forming supports for said luminous detector and for said contact prongs, said arms having embedded conductors operatively connecting said prongs respectively with opposite ends of said luminous detector.

In testimony whereof, I affix my signature.

CHARLES H. SPANGLER.